United States Patent
Ryan et al.

(10) Patent No.: US 9,169,615 B2
(45) Date of Patent: Oct. 27, 2015

(54) CONTROL SYSTEMS FOR A MINING VEHICLE

(71) Applicant: Caterpillar Global Mining LLC, Oak Creek, WI (US)

(72) Inventors: James Ryan, South Milwaukee, WI (US); Van I. Phifer, Greendale, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 197 days.

(21) Appl. No.: 13/740,631

(22) Filed: Jan. 14, 2013

(65) Prior Publication Data

US 2014/0199147 A1 Jul. 17, 2014

(51) Int. Cl.
*B60L 11/00* (2006.01)
*E02F 3/43* (2006.01)
*E02F 3/30* (2006.01)
*E02F 3/46* (2006.01)
*E02F 9/20* (2006.01)
*E02F 9/26* (2006.01)

(52) U.S. Cl.
CPC .................. *E02F 3/435* (2013.01); *B60L 11/00* (2013.01); *E02F 3/308* (2013.01); *E02F 3/46* (2013.01); *E02F 9/2033* (2013.01); *E02F 9/265* (2013.01)

(58) Field of Classification Search
CPC ............ B60L 11/00; E02F 3/435; E02F 3/46; E02F 9/2033; E02F 9/265; E02F 3/308
See application file for complete search history.

(56) References Cited

U.S. PATENT DOCUMENTS

| | | | |
|---|---|---|---|
| 4,776,751 A * | 10/1988 | Saele | 414/699 |
| 4,809,794 A | 3/1989 | Blair et al. | |
| 5,452,766 A | 9/1995 | Imamura et al. | |
| 6,466,850 B1 | 10/2002 | Hilgart | |
| 6,480,773 B1 | 11/2002 | Hilgart | |
| 7,356,397 B2 | 4/2008 | Porter | |
| 7,519,462 B2 | 4/2009 | Brown et al. | |
| 8,209,096 B2 | 6/2012 | Claxton | |
| 2011/0301817 A1 | 12/2011 | Hobenshield et al. | |
| 2012/0277961 A1 * | 11/2012 | Colwell et al. | 701/50 |
| 2012/0308354 A1 | 12/2012 | Tafazoli Bilandi et al. | |

FOREIGN PATENT DOCUMENTS

EP         0262764         4/1988

* cited by examiner

*Primary Examiner* — John Q Nguyen
*Assistant Examiner* — Michael Kerrigan
(74) *Attorney, Agent, or Firm* — Foley & Lardner LLP

(57) ABSTRACT

A mining shovel includes a dipper assembly comprising a dipper arm coupled to a dipper, a boom assembly configured to support the dipper assembly, and an overcrowd prevention system including one or more sensors configured to monitor an axial force. The mining shovel also includes a swing abuse prevention system, including one or more sensors configured to monitor one or more compound loading forces, and one or more sensors configured to monitor a torsion loading force. The mining shovel also includes a control module configured to receive signals from the sensors, and to control at least the crowding force applied to the dipper.

15 Claims, 5 Drawing Sheets

CONTROL SYSTEMS FOR A MINING VEHICLE

TECHNICAL FIELD

This disclosure relates to mining vehicles, such as mining shovels or excavators, and particularly to control systems for such mining vehicles.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Typical mining shovels or excavators use a dipper assembly to scoop earth or other material from horizontal or vertical faces. These conventional mining shovels typically have a fixed boom, and the dipper assembly is mounted on the boom via a crowd mechanism. The fixed boom extends upwardly and outwardly from the frame. The dipper assembly is typically forced into a generally vertical face (i.e. a bank, etc.) by a crowding force, digging into the bank and filling the dipper assembly with material. Once the dipper is filled with material, the dipper is moved to a deposit point to unload the material.

As the dipper assembly digs into the bank, the shovel operators are able to continue to apply a crowding force, perhaps excessively, forcing the dipper assembly into the bank. This excessive crowding force can cause damage to the dipper assembly or to other components of the mining shovel. The excessive crowding force can also cause a "boom jack" condition, where the boom pivots and "jacks" away from the ground as a result of the excessive force. Also, following loading of the dipper, operators often attempt to swing the dipper assembly before the assembly is sufficiently free of the bank. This swing force can cause the mining shovel to twist, creating a torsion force or compressive loading force on the mining shovel. This excessive force can also damage the mining shovel or its components.

Conventional mining shovels may include a crowd force control to prevent excessive crowd force. An example of such a conventional crowd force control can be found in U.S. Pat. No. 7,519,462 issued Apr. 14, 2009, for "Crowd Force Control in Electrically Propelled Machine." This patent discloses a method for limiting the output torque of an electric propulsion motor based upon the occurrence of a crowd force condition of the machine. This conventional method limits crowd force based on a crowd force threshold, however, and is susceptible to damage by an applied crowd force below the specified threshold.

SUMMARY

An embodiment of the present disclosure relates to a mining shovel. The mining shovel includes a dipper assembly comprising a dipper arm coupled to a dipper, the dipper arm configured to apply a crowding force to the dipper. The mining shovel also includes a boom assembly configured to support the dipper assembly, and an overcrowd prevention system including one or more sensors configured to monitor an axial force at the boom assembly. The mining shovel further includes a control module configured to receive signals from the sensors, and to control at least the crowding force applied to the dipper.

Another embodiment of the present disclosure relates to a mining shovel. The mining shovel includes a dipper assembly comprising a dipper arm coupled to a dipper, and a boom assembly comprising a boom foot, the boom assembly coupled to the dipper arm by a saddle block. The mining shovel also includes a frame having a first position rotatably coupled to a base, and a second position coupled to the boom foot so that the boom assembly and dipper assembly are coupled to the frame and rotate together with the frame relative to the base, the frame configured to support the boom assembly.

In this embodiment, the mining shovel further includes a swing abuse prevention system. The swing abuse prevention system includes one or more sensors located at the saddle block and configured to monitor one or more saddle block compound loading forces, and one or more sensors located at the boom foot and configured to monitor one or more boom foot compound loading forces. The mining shovel also includes a control module configured to receive signals from the sensors, and to control at least the rotation of the frame relative to the base.

Another embodiment of the present disclosure relates to a mining shovel. The mining shovel includes a dipper assembly comprising a dipper arm coupled to a dipper, the dipper arm configured to apply a crowding force to the dipper, and a boom assembly comprising a boom foot and coupled to the dipper arm by a saddle block, the boom assembly configured to support the dipper assembly. The mining shovel also includes a frame having a first position rotatably coupled to a base, and a second position coupled to the boom foot so that the boom assembly and dipper assembly are coupled to the frame and rotate together with the frame relative to the base, the frame configured to support the boom assembly.

In this embodiment, the mining shovel further includes an overcrowd prevention system. The overcrowd prevention system includes one or more sensors configured to monitor an axial force at the boom assembly, and one or more sensors configured to monitor a displacement at the boom assembly. The mining shovel also includes a swing abuse prevention system. The swing abuse prevention system includes one or more sensors located at the saddle block and configured to monitor one or more saddle block compound loading forces, and one or more sensors located at the boom foot and configured to monitor one or more boom foot compound loading forces. Further in this embodiment, the mining shovel includes a control module configured to receive signals from the sensors, and to control the rotation of the frame relative to the base, and the crowding force applied to the dipper.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
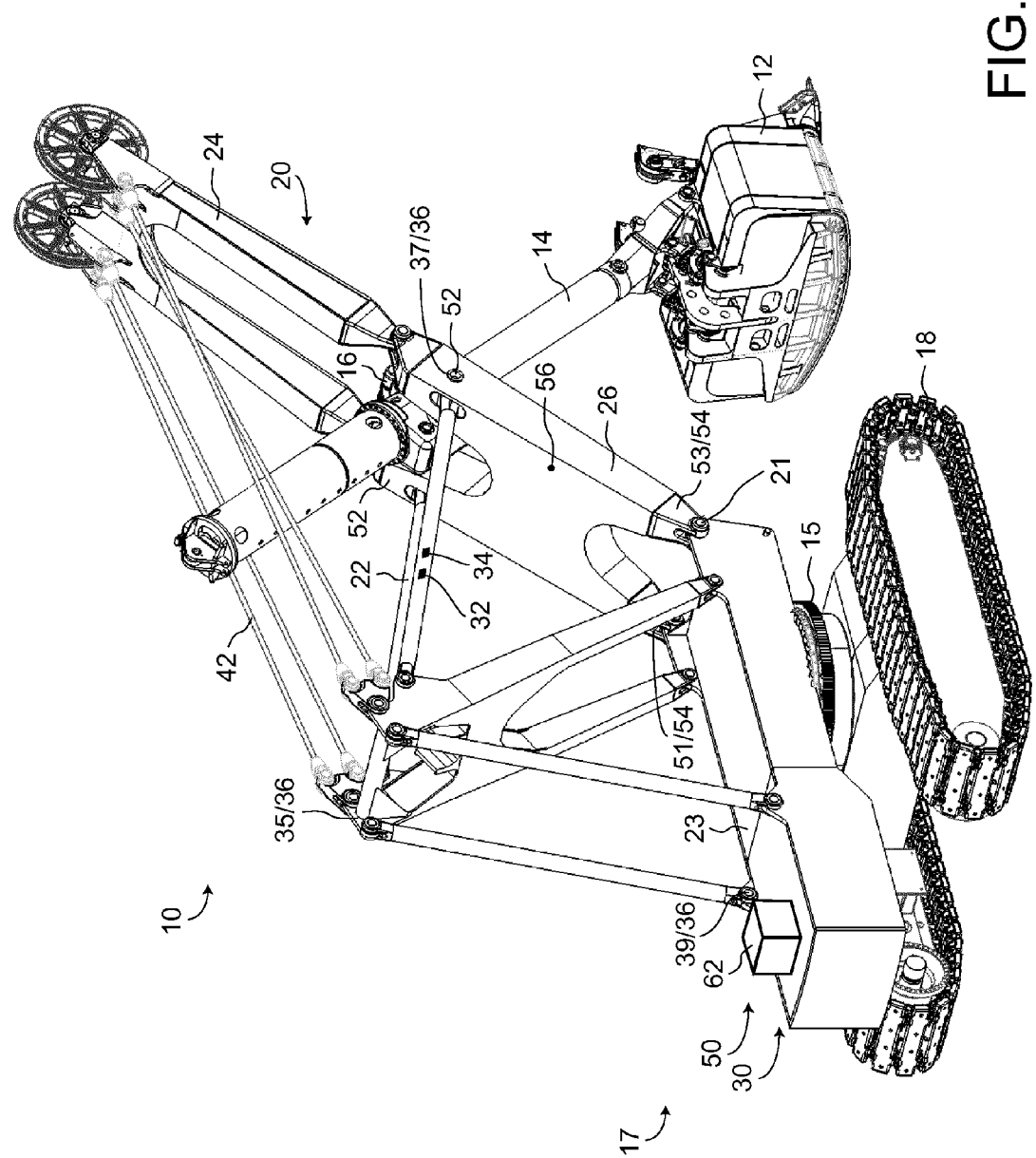
FIG. 1 is a perspective view of a rope shovel, according to an exemplary embodiment.
Figure 2:
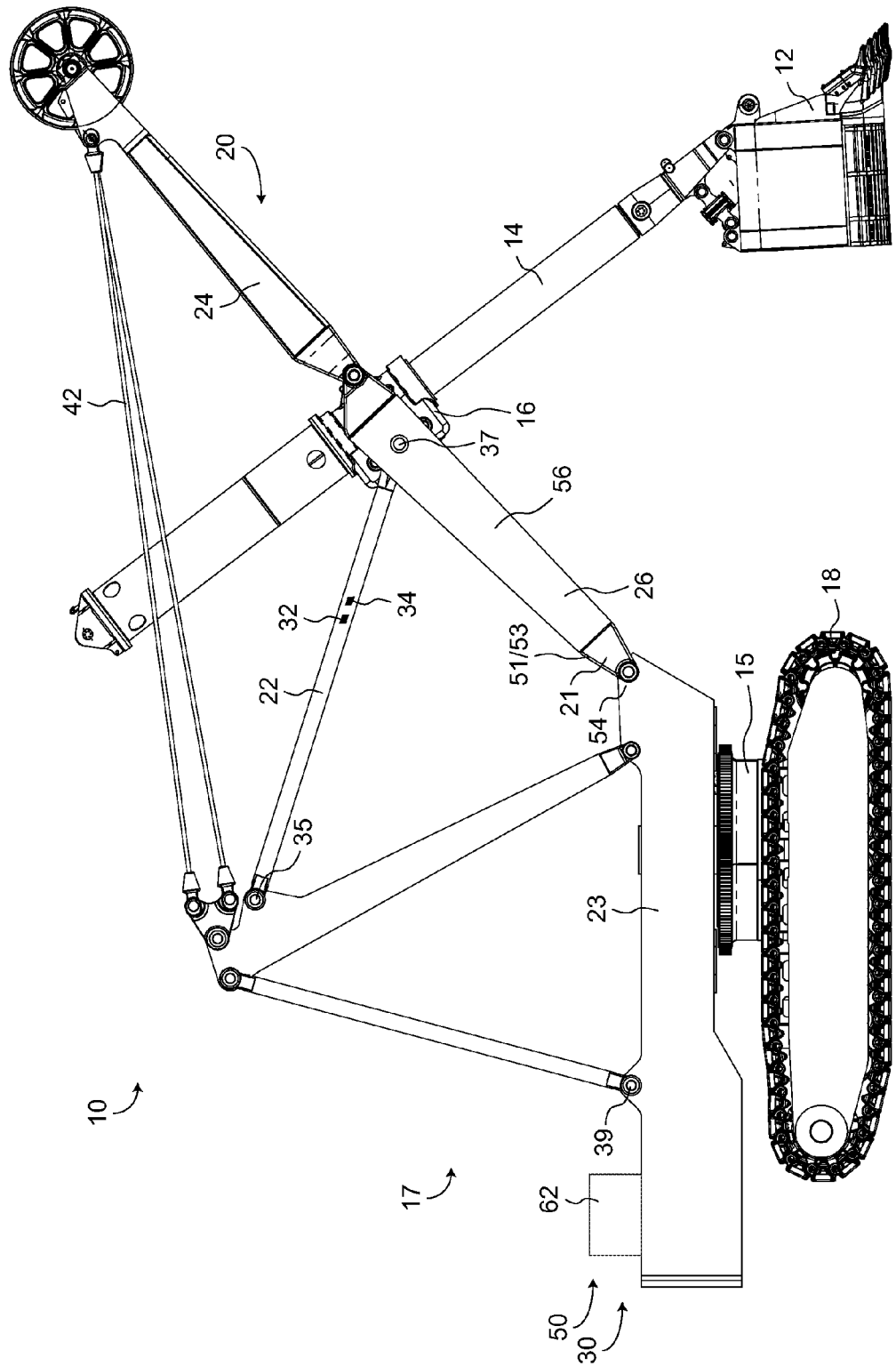
FIG. 2 is a side view of a rope shovel having a three-piece boom, according to an exemplary embodiment.

Referring now to FIGS. 1 and 2, a mining shovel 10 having a three-piece boom assembly 20 is shown, according to an exemplary embodiment. The mining shovel 10 includes an upper carriage 17 and a lower carriage 18. The upper carriage 17 is coupled to the lower carriage 18 by a rotor 15, and is configured to rotate with the rotor 15 relative to the lower carriage 18. The mining shovel 10 includes a dipper arm 14 and a dipper 12 supported by the boom assembly 20. In the illustrated embodiment of FIGS. 1 and 2, the boom assembly 20 includes three pieces, having a bottom portion 26, a top portion 24, and a support member 22. A boom foot 21 couples the boom assembly 20 to a frame 23. In other embodiments, the boom assembly 20 may include a single piece, such as in the illustrated embodiment of FIG. 3, or may be of another configuration suitable for the particular application. Although the disclosure is shown and described by way of example with reference to a mining shovel 10, the disclosure is also applicable for use with any vehicle that uses a crowding force to leverage a dipper or bucket into a material, such as excavators, etc., all of which are intended to be within the scope of this disclosure.

The dipper arm 14 is pivotably coupled to the boom assembly 20 by a saddle block 16. In exemplary embodiments, the saddle block 16 is configured to allow the dipper arm 14 to move in more than one direction. The dipper arm 14 is configured to move in a direction substantially perpendicular to the top portion 24 and bottom portion 26 of the boom assembly 20. The dipper arm 14 is also configured to rotate relative to the boom assembly 20. The dipper 12 is coupled to the dipper arm 14, moving in more than one direction along with the dipper arm 14. The dipper 12 is configured to hold earth and other materials that are loaded into the dipper 12 by the action of the dipper arm 14. The dipper arm 14 is configured to apply a crowding force to the dipper 12. The crowding force pushes the dipper 12 into a surface (i.e. a bank of material such as overburden, ore, or other material to be mined or moved and referred to collectively as "mining material"). The dipper 12 is forced into the bank by the crowding force, digging into the bank and filling the dipper 12 with mining material (e.g. earth, fragmented rock, etc.).

The mining shovel 10 also includes a control system that, among other control features, is intended to prevent an excessive crowding force from damaging the shovel 10 or its components, and is described more particularly herein as an overcrowd abuse prevention system 30. Still referring to FIGS. 1 and 2, the overcrowd abuse prevention system 30 is configured to prevent an overcrowd condition at the dipper 12. An overcrowd condition occurs when the mining shovel 10 applies an excessive crowd force (i.e. above a predetermined limit) to the dipper 12. For instance, an overcrowd condition may occur when the dipper 12 is engaged with a bank of mining material and an excessive crowd force is applied, potentially damaging the dipper 12 and/or lifting a portion of the mining shovel 10 off of the ground. The overcrowd abuse prevention system 30 is configured to prevent the mining shovel 10 from applying an excessive crowd force (i.e. above a predetermined limit), thus preventing damage to the mining shovel 10 or its components.

According to one exemplary embodiment, the overcrowd abuse prevention system 30 includes a load sensor 32 located on the support member 22 of the boom assembly 20. The load sensor 32 is configured to monitor (e.g. measure, etc.) the axial load or force on the support member 22. According to exemplary embodiments, the load sensor 32 is a strain gauge. In other embodiments, the load sensor 32 may be located in another location suitable for monitoring the axial force on the boom assembly 20. The load sensor 32 sends a signal representing the axial force to a control module 62 (shown in FIG. 4). The signal may be used by the control module 62 to determine whether an overcrowd condition is present or likely (e.g. the axial force is approaching a predetermined limit). The control module 62 may then be configured to use the signal from the load sensors 32 to control (e.g. limit) the crowd force applied to the dipper 12. For instance, the overcrowd abuse prevention system 30 may include a predetermined limit for axial force. As the force at the boom assembly 20 approaches the predetermined limit, the control module 62 may be configured to reduce or prevent further increase of the crowd force applied to the dipper 12. When the predetermined limit is reached, the control module 62 may be configured to prevent the mining shovel 10 from applying a further crowd force to the dipper 12. The control module 62 may also be configured to provide one or more audible, visual, or other sensory warnings (e.g. warning light, noise, alarm, haptic joystick, etc.) to the operator as the axial force increases, indicating that an overcrowd condition has occurred or is likely to occur. The warnings provided by the control module 62 may be variable. For example, according to one embodiment, the warning may increase in intensity as the axial force approaches the predetermined limit. The control module 62 may provide a first warning when the predetermined limit is approached, a second warning (e.g. louder, brighter, higher frequency or tone, increased vibration, etc.) as the axial force increases further, and a third warning when the predetermined limit is reached.

The overcrowd abuse prevention system 30 may also include one or more displacement sensors 34. In exemplary embodiments, the mining shovel 10 includes a single displacement sensor 34 located on the support member 22. The displacement sensor 34 is configured to monitor the axial displacement (i.e. movement along the axis) of the support member 22 relative to the joints 35 and 37. The displacement sensor 34 may be a strain gauge in exemplary embodiments, or may be another type of sensor 34 configured to measure axial displacement. The displacement sensor 34 sends a signal representing the axial displacement to the control module 62. The control module 62 may be configured to use the signal from the displacement sensors 34 to control the crowd force applied to the dipper 12, such as when an overcrowd condition is present or likely to occur. For instance, the overcrowd abuse prevention system 30 may include a predetermined limit for axial displacement. As the displacement at the support member 22 approaches the predetermined limit, the control module 62 may be configured to reduce the crowd force applied to the dipper 12. When the predetermined limit is reached, the control module 62 may be configured to prevent the mining shovel 10 from applying a further crowd force to the dipper 12. The control module 62 may also be configured to provide one or more audible, visual, or other sensory warnings (e.g. warning light, noise, alarm, haptic joystick, etc.) to the operator as the axial displacement increases, indicating that an overcrowd condition has occurred or is likely to occur.

The warnings provided by the control module 62 may be variable. For example, according to one embodiment, the warning may increase in intensity as the axial displacement approaches the predetermined limit. The control module 62 may provide a first warning when the predetermined limit is approached, a second warning (e.g. louder, brighter, higher frequency or tone, increased vibration, etc.) as the axial displacement increases further, and a third warning when the predetermined limit is reached.

The overcrowd abuse prevention system 30 may also include one or more trigger sensors 36. In exemplary embodiments, the system 30 includes three trigger sensors 36 located at three joints 35, 37, and 39 on the boom assembly 20. The trigger sensors 36 include a clearance gap (i.e. space around a joint to allow movement about the joint) at each of the joints 35, 37, and 39. The clearance gaps remain open until the boom assembly 20 is subjected to an excessive load force (i.e. above a predetermined load limit). An excessive load force may occur when the mining shovel 10 applies a crowd force to the dipper 12 as the dipper 12 is engaged within a bank of mining material. When the boom assembly 20 is subjected to an excessive crowd force, the clearance gaps at the joints 35, 37, and 39 are closed, activating the trigger sensors 36. The trigger sensors 36 are configured to send a signal to the control module 62 when activated, indicating that an overcrowd condition may be present. The control module 62 is configured to reduce the crowd force applied or prevent the mining shovel 10 from applying a further crowd force when one or more trigger sensors 36 are activated. In other embodiments, the trigger sensors 36 may include any other component suitable for monitoring the load at the joints 35, 37, and 39 of the boom assembly 20.

According to another embodiment, the control system of the mining shovel 10 also includes a swing abuse prevention system 50, which may be operable in combination with the overcrowd abuse prevention system 30, or independent of the overcrowd abuse prevention system 30. The upper carriage 17 of the mining shovel 10 is rotatably coupled to the lower carriage 18 by the rotor 15. The upper carriage 17, including the dipper arm 14 and dipper 12, rotates in relation to the lower carriage 18, swinging the dipper arm 14 with a "swing" force. The swing abuse prevention system 50 is configured to prevent the mining shovel 10 from applying an excessive swing force to the dipper arm 14. For instance, when the dipper 12 is engaged with a bank of mining material, applying an excessive swing force to the dipper arm 14 could damage the dipper 12 or other components of the mining shovel 10.

The swing abuse prevention system 50 includes one or more swing load sensors 52 configured to monitor a loading force. In exemplary embodiments, the mining shovel 10 includes two swing load sensors 52, including one swing load sensor 52 on each side of the saddle block 16 and at the connection to the boom assembly 20. When a swing force is applied to a dipper 12 already engaged with a bank of mining material, compound loading (i.e. an uneven load force between two sides of a component) may occur at the boom foot 21 and at the saddle block 16. The swing load sensors 52 are configured to monitor the load force at each side of the saddle block 16 in order to identify a compound loading condition (i.e. a substantially uneven load force) between the two sides. The compound loading force is torsional about the boom axis, and perpendicular to the axis of the dipper arm 14. The swing load sensors 52 are configured to send a signal representing the load force at each side of the saddle block 16 to the control module 62. The signal may be used by the control module 62 to determine whether a compound loading condition is present or likely to occur. A compound loading condition may be present when the difference in load force between the two sides of the saddle block 16 (i.e. "loading force differential") reaches a predetermined limit.

The swing abuse prevention system 50 also includes one or more swing load sensors 54. In exemplary embodiments, the system 50 includes two swing load sensors 54 located at the boom foot 21. The swing load sensors 54 are located at each of the joints 51 and 53 that couple the boom foot 21 to the frame 23. The swing load sensors 54 are configured to monitor the load force at the joints 51 and 53 in order to identify a potential compound loading condition at the two joints 51 and 53. The swing load sensors 54 are configured to send a signal representing the load force at the two joints 51 and 53 to the control module 62. The signal may be used by the control module 62 to determine whether a compound loading condition is present or likely to occur. A compound loading condition may be present when the difference in load force between the two joints 51 and 53 (i.e. loading force differential) reaches a predetermined limit.

The control module 62 receives signals from the swing load sensors 52 and 54. The control module 62 is configured to interpret the signals to determine whether a swing force can be applied to the dipper arm 14 without damaging the dipper 12 or other components of the mining shovel 10. The control module 62 may then be configured to use the signals to control the swing force applied to the dipper arm 14. For instance, the swing abuse prevention system 50 may include a predetermined limit for a loading force differential. As the loading force differential at the saddle block 16 or the joints 51 and 53 approaches the predetermined limit, the control module 62 may be configured to reduce the swing force applied to the dipper 12. When the predetermined limit is reached, the control module 62 may be configured to prevent the mining shovel 10 from applying a further swing force to the dipper arm 14. The control module 62 may also be configured to provide one or more audible, visual, or other sensory warnings (e.g. warning light, noise, alarm, haptic joystick, etc.) to the operator as the loading force differential increases, indicating that causing the dipper arm 14 to swing may damage the dipper 12 or other components of the mining shovel 10. The warnings provided by the control module 62 may be variable. For example, according to one embodiment, the warning may increase in intensity as the loading force differential approaches the predetermined limit. The control module 62 may provide a first warning when the predetermined limit is approached, a second warning (e.g. louder, brighter, higher frequency or tone, increased vibration, etc.) as the loading force differential increases further, and a third warning when the predetermined limit is reached.

The swing abuse prevention system 50 also includes one or more torsion load sensors 56 configured to monitor the torsion loading force (i.e. twisting due to torque) on the boom assembly 20. In exemplary embodiments, the swing load sensors 54 are located on the boom assembly 20, and are configured to send a signal to the control module 62 representing the torsion loading force on the boom assembly 20. The signal may be used by the control module 62 to determine whether applying a swing force to the dipper arm 14 may damage the dipper 12 or other components of the mining shovel 10. The control module 62 is configured to use the signal to control the swing force applied to the dipper arm 14. For instance, the swing abuse prevention system 50 may include a predetermined limit for torsion loading force. As the torsion loading approaches the predetermined limit, the control module 62 may be configured to reduce the swing force applied to the dipper 12. When the predetermined limit is reached, the control module 62 may be configured to prevent the mining shovel 10 from applying a further swing force to the dipper arm 14. The control module 62 may also be configured to provide one or more audible, visual, or other sensory warnings (e.g. warning light, noise, alarm, haptic joystick, etc.) to the operator as the torsion loading force increases, indicating that an overcrowd condition has occurred or is likely to occur. The warnings provided by the control module 62 may be variable. For example, according to one embodiment, the warning may increase in intensity as the torsion loading force approaches the predetermined limit. The control module 62 may provide a first warning when the predetermined limit is approached, a second warning (e.g. louder, brighter, higher frequency or tone, increased vibration, etc.) as the torsion loading force increases further, and a third warning when the predetermined limit is reached.

Figure 3:
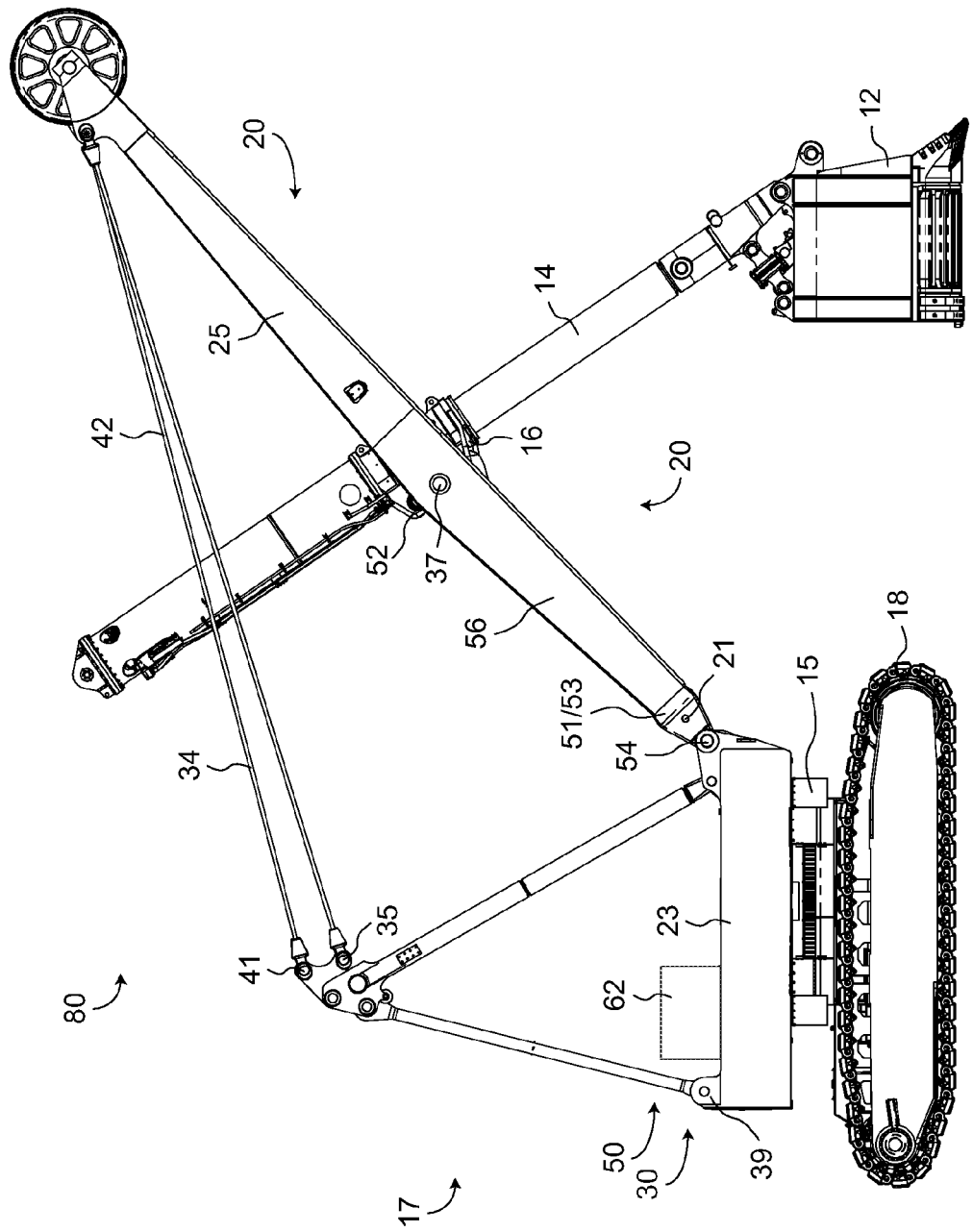
FIG. 3 is a side view of a rope shovel having a one-piece boom, according to an exemplary embodiment.

Referring now to FIG. 3, a mining shovel 80 having a one-piece boom assembly 20 is shown, according to another exemplary embodiment. The boom assembly 20 of the mining shovel 80 includes a single portion 25 and is shown without the support member 22 of the mining shovel 10. The mining shovel 80 includes an overcrowd abuse prevention system 30, including at least one load sensor 32 and at least one trigger sensor 36. The mining shovel 80 also includes suspension ropes 42 suspending the boom assembly 20 from the frame 23. In the illustrated embodiment of FIG. 3, one or more load sensors 32 are located on the suspension ropes 42. The load sensor 32 is configured to monitor the tension on the suspension ropes 42, sending a signal to the control module 62 representing the tension. The control module 62 uses the signal from the load sensor 32 to control the crowd force applied to the dipper 12.

In exemplary embodiments, the mining shovel 80 includes trigger sensors 36 located at a connection joint 41 and joint 35. The trigger sensors 36 include a clearance gap (i.e. space around a joint to allow movement about the joint) at each of the joints 35 and 41. When there is tension in the suspension ropes 42 (i.e. no slack), the clearance gap is clear and the trigger sensor 36 is not activated. When there is slack in the suspension ropes 42, the clearance gap is eliminated, and the trigger sensor 36 is activated. The trigger sensor 36 is configured to send a signal to the control module 62 when the trigger sensor 36 is activated. The control module 62 uses the signal from the trigger sensor 36 to control the crowd force applied to the dipper 12.

In other exemplary embodiments, the overcrowd abuse prevention system 30 may be located at the lower carriage 18 of the mining shovel 10 or 80. In these embodiments, the load sensor 32 is located at the rotor 15. The load sensor 32 is configured to monitor vertical load force changes at the rotor 15, sending a signal representing the load forces to the control module 62. The displacement sensor 34 may also be located at the rotor 15. The displacement sensor 34 is configured to monitor the vertical displacement at the rotor 15, sending a signal representing the displacement at the rotor 15 to the control module 62. The control module 62 is configured to receive the signals from the load sensor 32 and the displacement sensor 34, using the signals to control the crowd force applied to the dipper 12.

Figure 4:
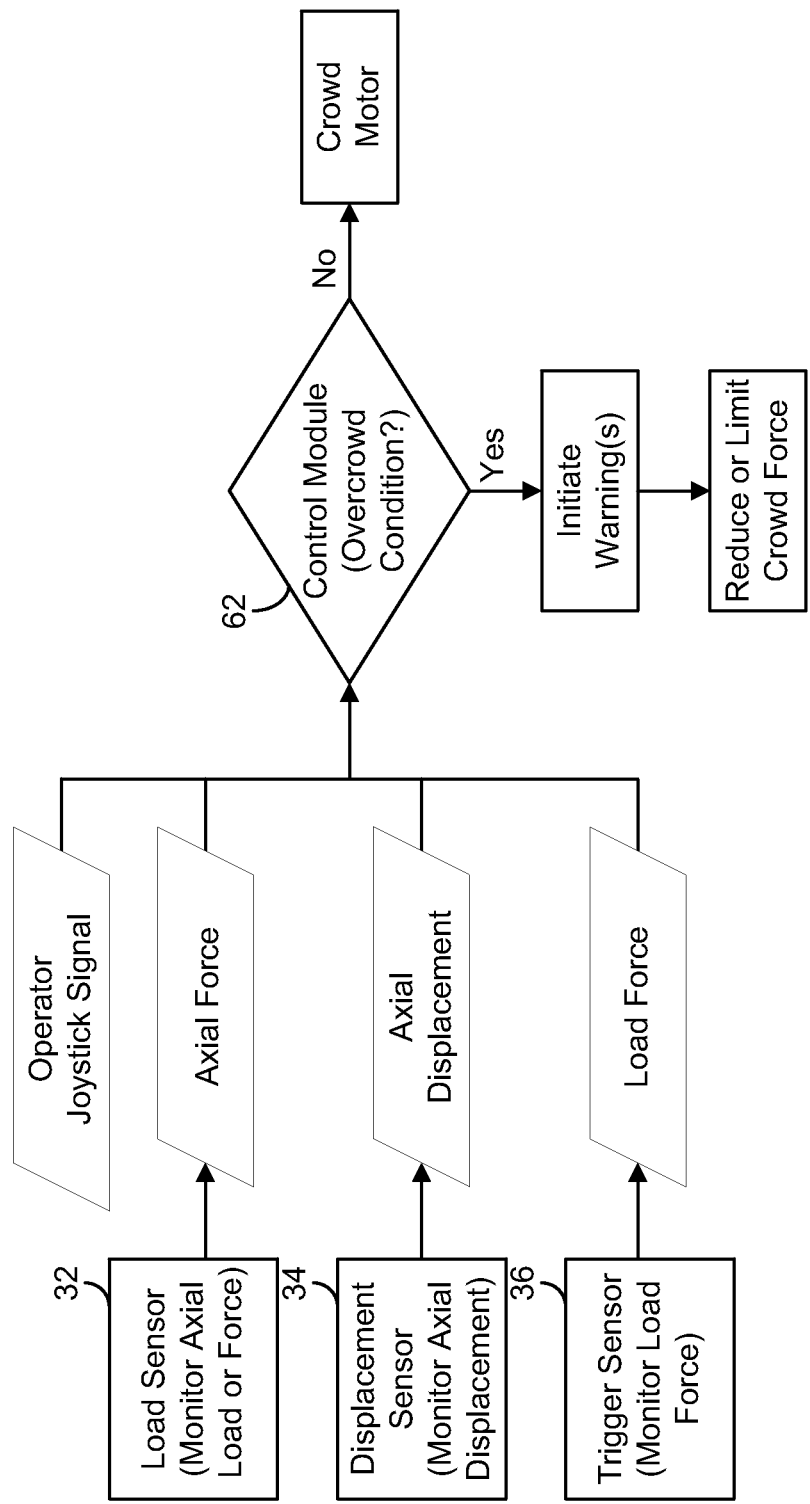
FIG. 4 is a flow chart representation of the overcrowd abuse prevention system, according to an exemplary embodiment.

Referring now to FIG. 4, a flow chart representation of the overcrowd abuse prevention system 30 is shown, according to an exemplary embodiment. The control module 62 may receive signal inputs from one or more load sensors 32, one or more displacement sensors 34, and one or more trigger sensors 36. The load sensor 32 monitors the axial load or force and sends a signal representing the axial force to the control module 62. The displacement sensor 34 monitors the axial displacement and sends a signal representing the axial displacement to the control module 62. The trigger sensor 36 monitors the load force and sends a signal to the control module 62 when activated by an excessive load force. The control module 62 also receives input from an operator interface (e.g. joystick, etc.) representing the amount of crowd force applied to the dipper 12. The control module 62 receives each of the inputs and processes the inputs to determine whether an overcrowd condition is present or likely to occur. If an overcrowd condition is not present or likely to occur, the control module 62 may allow a crowd force to be applied to the dipper 12. If an overcrowd condition is present or likely to occur, the control module 62 may initiate one or more audible or visual warnings (e.g. warning light, noise, alarm, etc.) to the operator. The control module 62 may be configured to initiate one or more warnings when an overcrowd condition is present or when an overcrowd condition is likely to occur. The control module 62 may also limit or reduce the crowd force applied to the dipper 12 if an overcrowd condition is present or likely to occur.

Figure 5:
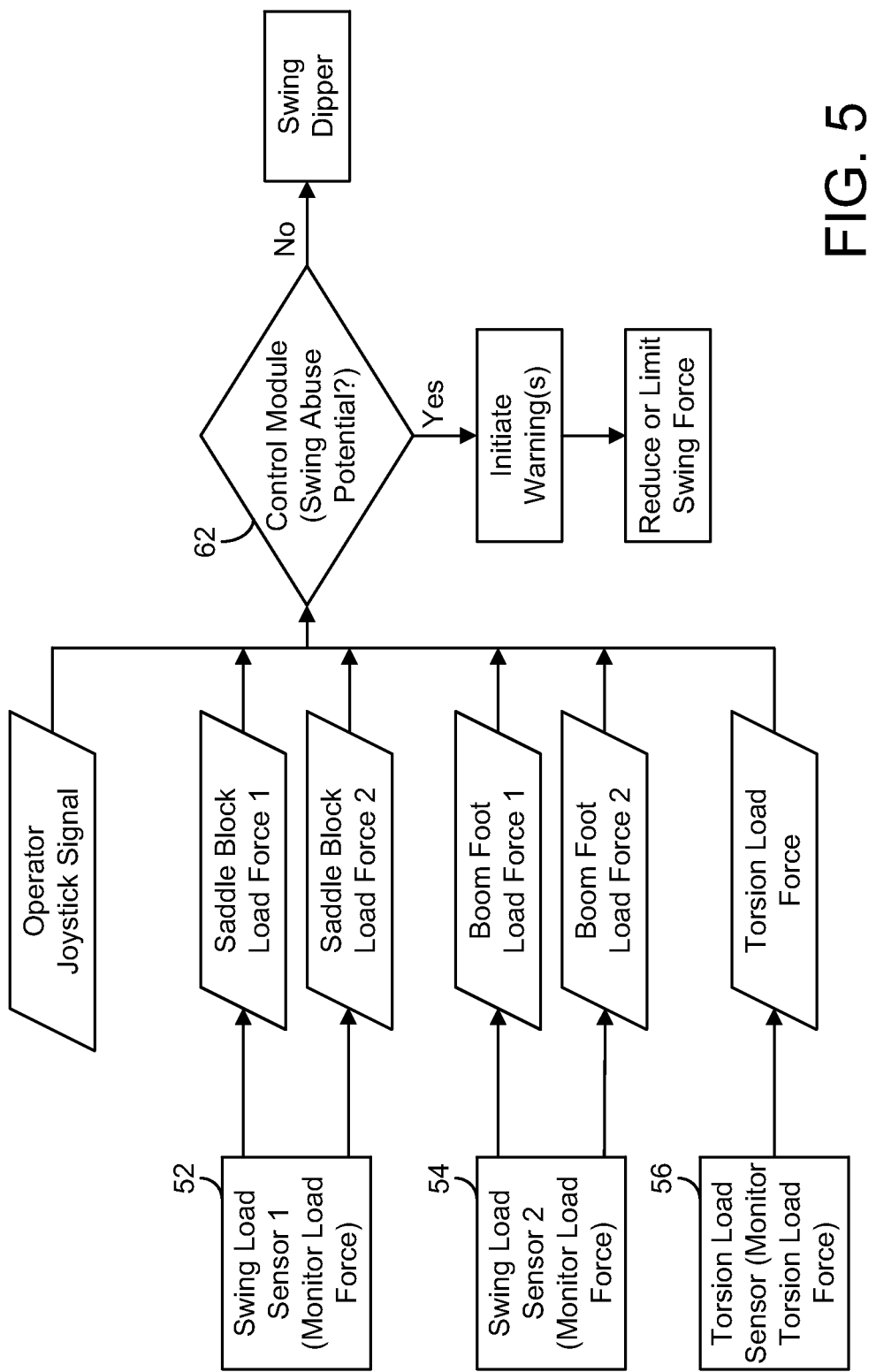
FIG. 5 is a flow chart representation of the swing abuse prevention system, according to an exemplary embodiment.

Referring now to FIG. 5, a flow chart representation of the swing abuse prevention system 50 is shown, according to an exemplary embodiment. The control module 62 may receive signal inputs from one or more swing load sensors 52 and 54, and from one or more torsion load sensors 56. The swing load sensor 52 monitors the load force at each side of the saddle block 16 and sends a signal representing the two load forces to the control module 62. The swing load sensor 54 monitors the load force at each side of the boom foot 21 and sends a signal representing the two load forces to the control module 62. The torsion load sensor 56 monitors the torsion load force at the boom assembly 20 and sends a signal representing the torsion load force to the control module 62. The control module 62 also receives input from an operator interface (e.g. joystick, etc.) representing the amount of crowd force applied to the dipper 12. The control module 62 receives each of the inputs and processes the inputs to determine whether there is the potential for swing abuse at the dipper 12. If there is no potential for swing abuse, the control module 62 may allow a swing force to be applied to the dipper 12. If there is a potential for swing abuse, the control module 62 may initiate one or more audible or visual warnings (e.g. warning light, noise, alarm, etc.) to the operator. The control module 62 may also limit or reduce the swing force applied to the dipper 12 if there is potential for swing abuse at the dipper 12.

The construction and arrangements of the control systems, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed control systems may be implemented into any rope shovel or other excavator applying a crowd force or a swing force. The disclosed control systems may reduce damage to the dipper assembly and other components of the mining shovel by controlling the crowd force applied by the shovel when the dipper is engaged with a mining surface. The disclosed control systems may also prevent a boom jack condition from occurring, preventing the mining shovel from applying a crowd force when the mining shovel is forced backward by the crowd force. The disclosed control systems may also reduce damage to the dipper assembly and other components of the mining shovel by controlling the swing force applied to the dipper assembly when the dipper is engaged with a mining surface.

It will be apparent to those skilled in the art that various modifications and variations can be made to the disclosed control systems. Other embodiments will be apparent to those skilled in the art from consideration of the specification and practice of the disclosed control systems. It is intended that the specification and examples be considered as exemplary only, with a true scope being indicated by the following claims and their equivalents.

What is claimed is:

1. A mining shovel, comprising:
a dipper assembly comprising a dipper arm coupled to a dipper, the dipper arm configured to apply a crowding force to the dipper;
a boom assembly configured to support the dipper assembly, the boom assembly comprising a boom and a substantially horizontal support member coupled to the boom and configured to receive an axial force in a direction substantially opposite the applied crowding force;
an overcrowd prevention system comprising one or more sensors configured to monitor the axial force at the support member; and
a control module configured to receive signals from the sensors, and to control at least the crowding force applied to the dipper based on the axial force at the support member.

2. The mining shovel of claim 1, wherein the overcrowd prevention system further comprises one or more sensors configured to monitor a displacement at the boom assembly.

3. The mining shovel of claim 1, the boom further comprising an upper portion coupled to a lower portion, the lower portion being coupled to the support member at a boom joint such that the support member is configured to eliminate motion of the mining shovel in a direction substantially opposite to the crowding force.

4. The mining shovel of claim 1, wherein the one or more sensors are located on the support member and configured to monitor the axial force at the support member.

5. The mining shovel of claim 1, further comprising one or more displacement sensors located on the support member and configured to monitor axial displacement at the support member, wherein the control module is communicatively coupled to the one or more displacement sensors and configured to control the crowding force applied to the dipper based on the axial displacement at the support member.

6. The mining shovel of claim 3, further comprising one or more trigger sensors located at the boom joint, the trigger sensors configured to monitor a loading force at the boom joint, wherein the control module is communicatively coupled to the one or more trigger sensors and configured to control the crowding force applied to the dipper based on the loading force at the boom joint.

7. The mining shovel of claim 6, wherein the trigger sensors have an activated position and a non-activated position, and the trigger sensors are configured to move to the activated position when a predetermined loading force is applied to the trigger sensors, transmitting the signal to the control module when in the activated position.

8. The mining shovel of claim 2, wherein the boom assembly further comprises suspension ropes configured to suspend the boom assembly from the frame.

9. The mining shovel of claim 8, wherein one or more load sensors are located on the suspension ropes and configured to monitor the tension on the suspension ropes.

10. The mining shovel of claim 2, further comprising an upper carriage coupled to a lower carriage by a rotor, the rotor comprising one or more sensors configured to monitor vertical load force changes at the rotor.

11. A mining shovel, comprising:
a dipper assembly comprising a dipper arm coupled to a dipper;
a boom assembly comprising a boom foot, the boom assembly coupled to the dipper arm by a saddle block;
a frame coupled to the boom foot and rotatably coupled to a base of the mining shovel so that the boom assembly and dipper assembly are coupled to the frame and configured to rotate together with the frame relative to the base, the frame configured to support the boom assembly;
a swing abuse prevention system, comprising:
a first saddle block load sensor located at a first side of the saddle block and a second saddle block load sensor located at a second side of the saddle block, the first saddle block load sensor configured to monitor a first saddle block compound loading force, and the second saddle block load sensor configured to monitor a second saddle block compound loading force; and
a first boom foot load sensor located at a first side of the boom foot and a second boom foot load sensor located at a second side of the boom foot, the first boom foot load sensor configured to monitor a first boom foot compound loading force, and the second boom foot load sensor configured to monitor a second boom foot compound loading force; and
a control module configured to receive signals from the sensors, and to control the rotation of the frame relative to the base so that the difference between the first and second saddle block compound loading forces is maintained below a predetermined limit for saddle block compound loading force differential, and so that the difference between the first and second boom foot compound loading forces is maintained below a predetermined limit for boom foot compound loading force differential.

12. The mining shovel of claim 11, further comprising one or more sensors configured to monitor a torsion loading force at the boom assembly, wherein the control module is configured to limit the rotation of the frame relative to the base so that the torsion loading force is maintained below a predetermined limit for torsion loading force.

13. A mining shovel, comprising:
a dipper assembly comprising a dipper arm coupled to a dipper, the dipper arm configured to apply a crowding force to the dipper;
a boom assembly comprising a boom foot and coupled to the dipper arm by a saddle block, the boom assembly configured to support the dipper assembly;
a frame coupled to the boom foot and rotatably coupled to a base of the mining shovel so that the boom assembly and dipper assembly are coupled to the frame and configured to rotate together with the frame relative to the base, the frame configured to support the boom assembly;

an overcrowd prevention system, comprising:
- one or more sensors configured to monitor an axial force at the boom assembly; and
- one or more sensors configured to monitor a displacement at the boom assembly;

a swing abuse prevention system, comprising:
- a first saddle block load sensor located at a first side of the saddle block and a second saddle block load sensor located at a second side of the saddle block, the first saddle block load sensor configured to monitor a first saddle block compound loading force, and the second saddle block load sensor configured to monitor a second saddle block compound loading force; and
- a first boom foot load sensor located at a first side of the boom foot and a second boom foot load sensor located at a second side of the boom foot, the first boom foot load sensor configured to monitor a first boom foot compound loading force, and the second boom foot load sensor configured to monitor a second boom foot compound loading force; and
- a control module configured to receive signals from the sensors, and to control the rotation of the frame relative to the base so that the difference between the first and second saddle block compound loading forces is maintained below a predetermined limit for saddle block compound loading force differential, and so that the difference between the first and second boom foot compound loading forces is maintained below a predetermined limit for boom foot compound loading force differential, and to control the crowding force applied to the dipper based on at least one of the axial force at the boom assembly and the displacement at the boom assembly.

14. The mining shovel of claim 13, further comprising one or more sensors configured to monitor a torsion loading force at the boom assembly, wherein the control module is configured to limit the rotation of the frame relative to the base so that the torsion loading force is maintained below a predetermined limit for torsion loading force.

15. The mining shovel of claim 11, wherein the compound loading force at the saddle block is torsional about a boom axis and substantially perpendicular to the axis of the dipper arm.

* * * * *